United States Patent [19]

Damon

[11] Patent Number: 4,615,537
[45] Date of Patent: Oct. 7, 1986

[54] REDUCED FRICTION AUTOMOTIVE SUSPENSION STRUT MOUNTING

[75] Inventor: James J. Damon, Dearborn, Mich.

[73] Assignee: Ford Motor Company, Dearborn, Mich.

[21] Appl. No.: 684,898

[22] Filed: Dec. 21, 1984

[51] Int. Cl.⁴ .............................................. B60G 11/42
[52] U.S. Cl. ................................. 280/668; 188/321.11
[58] Field of Search .............. 280/668, 661, 660, 96.1; 188/321.11

[56] References Cited

U.S. PATENT DOCUMENTS

| Re. 31,184 | 3/1983 | Lederman | 280/668 |
| D. 272,392 | 1/1984 | Bigelow | 280/661 |
| 4,372,575 | 2/1983 | Hyma | 280/668 |

FOREIGN PATENT DOCUMENTS 1424208  11/1965  France ................. 280/660

Primary Examiner—John J. Love
Assistant Examiner—Ross Weaver
Attorney, Agent, or Firm—Jerome R. Drouillard; Roger L. May

[57] ABSTRACT

In an automotive vehicle suspension including a telescoping strut, means for reducing static friction within the strut by causing either the upper end or the lower end or both ends of the strut to be rotated outboard with respect to the balance of said strut, whereby friction within the strut will be reduced.

5 Claims, 3 Drawing Figures

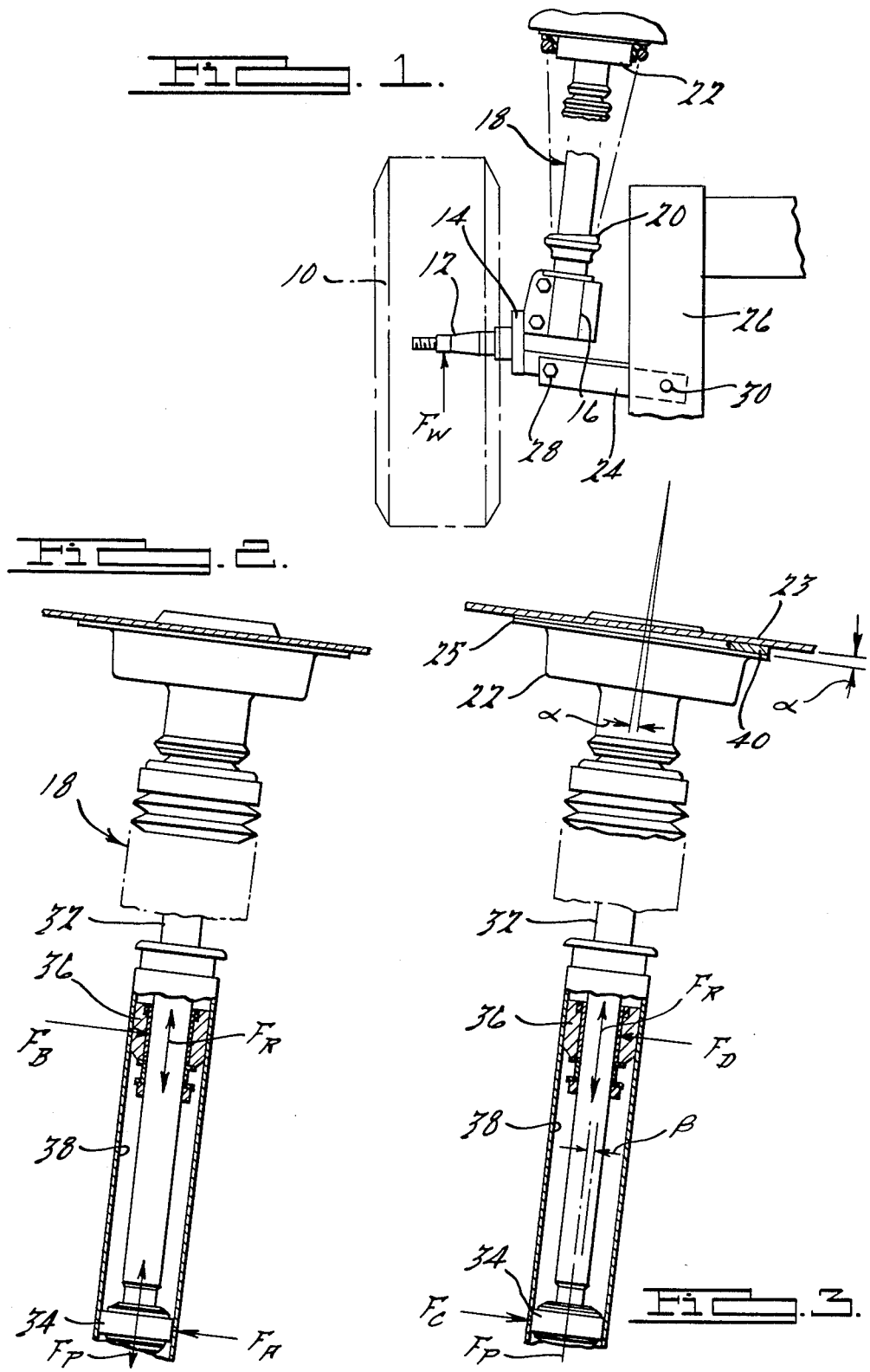

REDUCED FRICTION AUTOMOTIVE SUSPENSION STRUT MOUNTING

BACKGROUND OF THE INVENTION

1. Field of the Invention

This invention relates generally to a means for mounting automotive suspension struts so as to reduce operating friction within the strut.

2. Disclosure Information

Automotive suspension designs incorporating struts have taken a variety of forms. In the true MacPherson design, the strut is positioned between a wheel carrier, to which it is rigidly mounted, and the chassis, to which it is pivotally mounted. A coil spring is commonly mounted concentrically about the strut. In the "modified" MacPherson design, a spring mechanism is mounted between a lower control arm attached to the wheel carrier and the chassis. The strut is, nevertheless, rigidly fastened to the wheel carrier and pivotally mounted to the chassis at its upper end. The rigid mounting between the strut and the wheel carrier with both designs causes radially directed preloading of the strut pistion and bearing. This preloading is undesirable inasmuch as the static friction resulting therefrom increases the force necessary to initiate sliding of the pistion within the strut and therefore correspondingly increases the shock loading transmitted to the chassis of the vehicle when an obstruction is encountered on the roadway surface. Attempts to minimize this undesirable static friction have resulted in configurations wherein the spring is eccentrically mounted about the strut or the spring mounting pads are canted at an angle to the strut center line, as in U.S. Reissue Pat. No. 31,184. Although these solutions can result in a reduction of the strut friction, an undesirable effect may arise inasmuch as the packaging volume of the strut assembly may increase with either of the aforementioned structures.

The present invention is intended to effect a reduction of strut friction without causing an increase of the struts' package volume. A further object of the invention is the provision of a method for controllably reducing or modifying strut static friction characteristics. The present invention may be utilized with either MacPherson or modified MacPherson designs.

SUMMARY OF THE DISCLOSURE

In accordance with the present invention, a reduced friction automotive suspension strut mounting is intended for use with an accompanying suspension strut, a chassis, and a wheel carrier. The strut comprises a working cylinder rigidly attached to the wheel carrier, a piston slidably carried within the working cylinder, and a piston rod comprising a lower end attached to the piston and an upper end attached to the vehicle's chassis by means of a mounting plate. The piston rod is rotated outboard by the mounting plate about an axis which is generally parallel to the longitudinal centerline of the vehicle, so as to urge the locus of intersection of the longitudinal axes of the piston rod and the working cylinder in a direction outboard of the vehicle. This movement of the strut outboard is accompanied by a reduction in the operating friction within the strut.

BRIEF DESCRIPTION OF THE DRAWINGS

FIG. 1 is a front elevation, partially broken away, of a strut type suspension suitable for use with the present invention.

FIG. 2 is a front elevation, partially broken away, of a portion of the strut shown in FIG. 1, showing static forces normally acting upon the strut rod guide and piston.

FIG. 3 is a front elevation, similar to FIG. 2, showing the static forces acting upon the strut rod guide and piston following rotation of the piston rod outboard in accord with the present invention.

DETAILED DESCRIPTION OF THE DRAWING

As shown in FIG. 1, an example of an automotive suspension suitable for use with the present invention comprises wheel and tire assembly 10 rotatably mounted upon spindle 12 which is integral with wheel carrier 14. Wheel carrier 14 also includes socket 16 which accepts the lower end of strut 18, which is rigidly mounted to the wheel carrier. Coil spring 20 is mounted about strut 18. Strut mounting plate 22 connects strut 18 to the chassis of the vehicle. As its lower end, the suspension includes lower control arm 24 having inner pivot 30 and outer pivot 28. Control arm 24 is connected at its inboard end to chassis 26 by pivot 30 and at its outboard end to wheel carrier 14 by pivot 28.

FIGS. 2 and 3 show a portion of the strut from FIG. 1 in greater detail. As shown in FIGS. 2 and 3, strut 18 includes working cylinder 38 and pistion rod 32, upon which is attached piston 34. Piston rod 32 passes into the interior of working cylinder 38 through rod guide 36.

As shown in FIG. 1, the force of the vehicle's weight, labeled $F_W$, acts upward through spindle 12. This force creates an upward acting bending moment or torque which must be counteracted by strut 18. As shown in FIG. 2, this counteraction produces forces $F_A$ and $F_B$ acting radially upon piston 34 and piston rod 32, respectively. Forces $F_A$ and $F_B$, can be of considerable magnitude and are undesirable because they result in friction forces $F_P$ and $F_R$ acting upon piston 34 and piston rod 32, respectively, in a direction parallel to the telescopic motion of strut 18. These friction forces comprise a relatively unpredictable addition to the spring rate of coil spring 20. In other words, forces $F_A$ and $F_B$ produce frictional forces $F_P$ and $F_R$ resisting the telescoping action of strut 18 and thereby cause the vehicle suspension to have a harsher operating characteristic than would otherwise be possible were forces $F_A$ and $F_B$ to be minimized. Minimization of the effect of forces $F_A$ and $F_B$ by changing the point and magnitude of their application is accomplished by the present invention.

FIG. 3 shows the effect of mounting suspension strut 18 according to the present invention. As shown in FIG. 3, rotation of the upper end of the pistion rod through angle $\alpha$ relative to the remainder of the strut in a direction outboard of the vehicle, about an axis which is generally parallel to the longitudinal centerline of the vehicle, produces a shift $\beta$ in the locus of intersection of the axes of working cylinder 38 and piston rod 32. In the event that the shift $\beta$ is of sufficient magnitude, forces $F_C$ and $F_D$, acting upon piston 34 and piston rod 32 as indicated in FIG. 3, will be produced. The magnitude of forces $F_C$ and $F_D$, and correspondingly, the magnitude of forces $F_P$ and $F_R$, may be adjusted by changing the predeterminded angle of rotation of the upper mount, $\alpha$, to achieve the desired reduction in friction acting within the strut. The friction reduction of the present invention is thus a result of removing or easing the bending moment which would otherwise be caused by the weight of the vehicle acting through spindle 12. In practice, the shift $\beta$ will be of small magnitude and may thus be described as an urging of the locus of intersection of the longitudinal axes of piston rod 32 and working cylinder 38 in a direction outboard of the vehicle.

The reverse loading shown in FIG. 3 as forces $F_C$ and $F_D$ is not likely to persist during dynamic loading of the suspension inasmuch as force $F_W$ increases considerably with impact loading. During this condition, loading may reverse from that shown in FIG. 3 to the situation of FIG. 2. Nevertheless, the beneficial effect of the present invention will not cease merely because the locus of application of force against piston 34 and piston rod 32 changes dynamically, because the friction forces $F_P$ and $F_R$ will generally be of lesser magnitude during operation of a strut mounted according to the present invention. Indeed, although in certain vehicles design constraints may prohibit rotation of sufficient magnitude to cause the force reversal shown in FIGS. 2 and 3, forces $F_A$ and $F_B$ will in all cases be reduced.

Rotation of the upper end of the piston rod to accomplished the purposes of the instant invention may be accomplished in a variety of ways. FIG. 3 discloses one means for rotating the piston rod. As shown in FIG. 3, mounting plate 22 has been rotated through an angle $\alpha$ by the introduction of tapered spacer 40 between plate 22 and body mounting surface 23. Alternatively, it is possible to alter the configuration of mounting plate 22 to accomplish the same result while eliminating tapered spacer 40. This may be done by canting flange 25 at an angle which duplicates the introduction of tapered spacer plate 40 between plate 22 and body mounting surface 23. Finally, the desired rotation of strut mounting plate 22 may be obtained by canting body mounting surface 23 to yield the rotation otherwise produced by tapered spacer 40.

Those skilled in the art of suspension design will appreciate that it is possible to practice the present invention by rotating the lower mount of the strut outboard by canting socket 16, into which the lower end of strut 18 is fitted, in a direction outboard of the vehicle at a predetermined angle of rotation about an axis which is generally parallel to the longitudinal centerline of the vehicle.

The present invention can be utilized to allow tuning of a vehicle's ride characteristics to yield a desired operating condition. More specifically, by altering the angle $\alpha$, the operational friction forces of the vehicle's struts may be modified in a desired manner. If the friction within the suspension including the strut is measured and either or both of the ends of the strut is then rotated with respect to the remainder of the strut in the manner prescribed herein, the friction within the suspension may then be remeasured and the mounting of the strut readjusted. Successive iterations of this process will yield the desired reduction of friction within the strut.

The term "chassis", when used in the specification and claims, will be understood to refer to either a conventional vehicle chassis or to a conventional unitary chassis and body construction, and is intended to include vehicle structure and components connected to or supported upon the chassis structure and forming part of the sprung portion of the vehicle.

While preferred embodiments of the present invention have been shown and described, it is obvious to one skilled in the art that various modifications and substitutions may be made without departing from the spirit of the invention which is limited only in the scope of the appended claims.

What is claimed is:

1. An automotive vehicle suspension comprising:
   a wheel carrier;
   a strut comprising:
   (1) a working cylinder rigidly attached to said wheel carrier;
   (2) a piston slidably carried within said working cylinder; and
   (3) a piston rod comprising a lower end attached to said piston and an upper end attached to the chassis of said automotive vehicle; and
   means for mounting said strut so as to urge the locus of intersection of the longitudinal axes of said piston rod and said working cylinder in a direction outboard of said vehicle, whereby operating friction within said strut will be reduced, said means for mounting said strut comprising a plate for mounting the upper end of said pistion rod to said chassis, said plate having a base which is canted so as to urge the piston rod outboard of said vehicle at a predetermined angle of rotation about an axis which is generally parallel to the longitudinal centerline of the vehicle.

2. An automotive vehicle suspension comprising:
   a wheel carrier;
   a strut comprising:
   (1) a working cylinder rigidly attached to said wheel carrier;
   (2) a piston slidably carried within said working cylinder; and
   (3) a piston rod comprising a lower end attached to said piston and an upper end attached to the chassis of said automotive vehicle; and
   means for mounting said strut so as to urge the locus of intersection of the longitudinal axes of said piston rod and said working cylinder in a direction outboard of said vehicle, whereby operating friction within said strut will be reduced, wherein said means for mounting said strut comprises a plate for mounting the upper end of said piston rod to said chassis and a tapered wedge interposed between said mounting plate and said chassis, so as to urge the piston rod outboard of said vehicle at a predetermined angle of rotation about an axis which is generally parallel to the longitudinal centerline of the vehicle.

3. An automotive vehicle suspension comprising:
   a wheel carrier;
   a strut comprising:
   (1) a working cylinder rigidly attached to said wheel carrier;
   (2) a piston slidably carried within said working cylinder; and
   (3) a piston rod comprising a lower end attached to said piston and an upper end attached to the chassis of said automotive vehicle; and
   means for mounting said strut so as to urge the locus of intersection of the longitudinal axes of said piston rod and said working cylinder in a direction outboard of said vehicle, whereby operating friction within said strut will be reduced, wherein said means for mounting said strut comprises a plate for mounting the upper end of said piston rod, which plate is attached to a canted surface formed in said chassis so as to urge the piston rod outboard of said vehicle at a predetermined angle of rotation about an axis which is generally parallel to the longitudinal centerline of the vehicle.

4. An automotive vehicle suspension comprising:
a wheel carrier;
a strut comprising:
(1) a working cylinder rigidly attached to said wheel carrier;
(2) a piston slidably carried within said working cylinder; and
(3) a piston rod comprising a lower end attached to said piston and an upper end attached to the chassis of said automotive vehicle; and
   means for mounting said strut so as to urge the locus of intersection of the longitudinal axes of said piston rod and said working cylinder in a direction outboard of said vehicle, whereby operating friction within said strut will be reduced, wherein said means for mounting said strut comprises a canted socket formed in said wheel carrier, which socket rotates said working cylinder of said strut in a direction outboard of said vehicle at a predetermined angle of rotation about an axis which is generally parallel to the longitudinal centerline of the vehicle.

5. A method for controllably reducing the operating friction of an automotive suspension including a strut, comprising the steps of:
(i) measuring the friction within the suspension, including the strut, as installed upon the vehicle;
(ii) rotating either the upper end or the lower end of said strut outboard with respect to the remainder of said strut;
(iii) measuring the friction within the suspension having once rotated the strut mounting; and
(iv) repeating steps (ii) and (iii) to obtain the desired level of friction within the suspension.

* * * * *